(No Model.)
A. J. BLUNTACH.
INKSTAND.
No. 579,466. Patented Mar. 23, 1897.
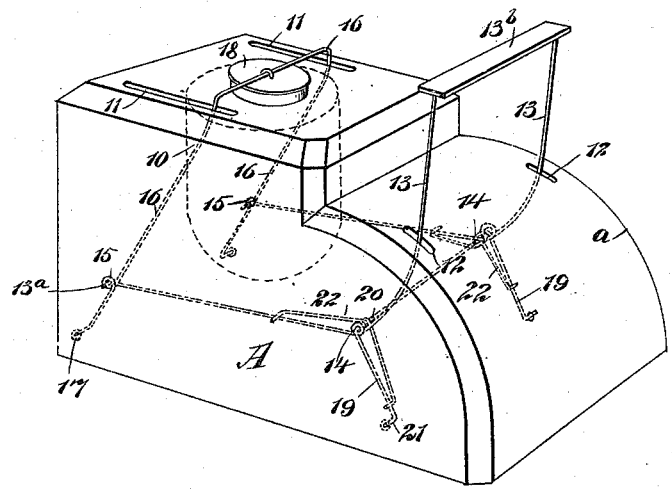
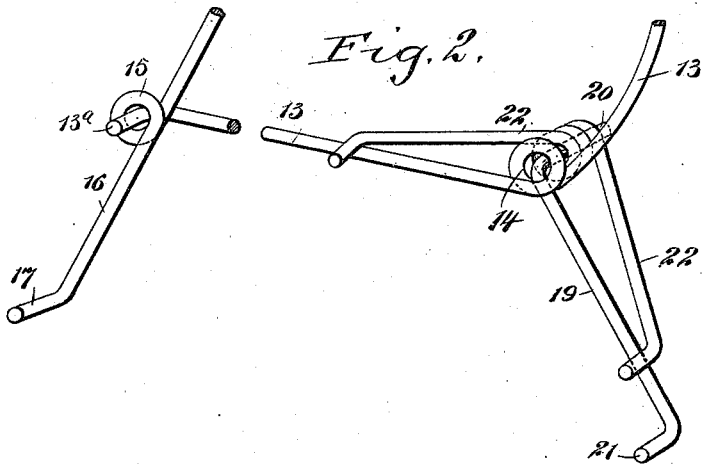
WITNESSES:
INVENTOR
ATTORNEYS.

UNITED STATES PATENT OFFICE.

ALEXANDER J. BLUNTACH, OF OLIVIA, MINNESOTA.

INKSTAND.

SPECIFICATION forming part of Letters Patent No. 579,466, dated March 23, 1897.

Application filed July 20, 1896. Serial No. 599,768. (No model.)

*To all whom it may concern:*

Be it known that I, ALEXANDER J. BLUNTACH, of Olivia, in the county of Renville and State of Minnesota, have invented a new and useful Improvement in Inkstands, of which the following is a full, clear, and exact description.

The object of my invention is to provide an attachment to an inkstand, whereby the cover of the ink-well may be removed during the act of carrying the pen to the well, and whereby as the pen is removed the cover will be automatically replaced over the ink-well, thereby effectually preventing dust or foreign material from contaminating the ink.

A further object of the invention is to construct an attachment for opening and closing the covers of ink-wells in inkstands, which attachment will be simple, durable, and economic.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of the inkstand having the improvement applied, and Fig. 2 is a detail perspective view of a part of one side portion of the attachment drawn on a large scale.

In carrying out the invention the inkstand A is provided, preferably, with a swell front $a$, and the ink-well 10 is located at the rear of the said front, the stand being provided with a chamber surrounding the ink-well and extending from front to rear and from side to side. In the top of the inkstand at each side of the ink-well parallel slots 11 are produced, and parallel slots 12 are likewise made in the front $a$ of the stand, these slots being in communication with the inner chamber of the stand.

Two opposing and substantially parallel arms 13, made of wire or a like material, are carried downward through the front slots 12, and after passing through the slots these arms are curved in a rearwardly direction and are bent upon themselves to form eyes 14, and the said arms are carried in practically a straight line rearward from the eyes and terminate in outwardly-extending cranks $13^a$, as shown in Fig. 2, the upper outer ends of the arms 13 being connected by a cross-bar $13^b$, which is in front of and preferably above the plane of the top of the body portion of the inkstand.

The crank ends $13^a$ of the arms 13, which may be termed "lever-arms," are fulcrumed in eyes 15, which are formed in the side members of a yoke or bail 16, the lower ends of the side members of the yoke or bail being pivoted in the side portions of the stand, and extending upward through the slots 11 at each side of the ink-well, and being made to cross and to carry the stopper 18, which is adapted to close the ink-well, as shown in Fig. 1.

A supporting-arm 19 is provided for each of the lever-arms 13, and each of the arms 19 is provided with an upper inwardly-extending crank connection 20, which cranks are carried through the eyes 14 in said lever-arms, and at the lower end of each supporting-arm 19 an outwardly-extending crank 21 is formed, and these latter cranks are pivoted in the side walls of the extension of the stand. The supporting-arms 19 may be separate, but they are preferably connected, as shown, being made from one piece of material.

A spring 22 is coiled around the upper crank 20 of each supporting-arm, and the ends of the springs have bearing upon the rearwardly-extending sections of the lever-arms 13 and upon the lower portions of the supporting-arms 19, as shown in both of the figures.

In operation the hand holding the pen is brought downward upon the cross-bar $13^b$ of the lever-arms 13, forcing the said arms downward, whereupon the springs 22 are placed under tension and the rear ends of the lever-arms are carried in a rearwardly direction, forcing the bail 16 to remove the stopper 18 from the ink-well, and this is accomplished at about the time that the cross-bar $13^b$ reaches a level which will admit of the pen entering the ink-well. When the hand is withdrawn from the cross-bar $13^b$, the springs 22 act to restore the parts of the attachment to their normal position and cause the stopper 18 to again cover the ink-well.

Having thus described my invention, I claim as new and desire to secure by Letters Patent—

1. The combination, with an inkstand, of a cover for the ink-well, a bail pivoted in the stand, and mounted to rock over the ink-well and connected with the cover lever-arms connected with the said bail, the said lever-arms extending outward and in front of the ink-well, pivoted supports for the said lever-arms, and springs having bearing on the lever-arms in such direction as to normally hold the bail in position to place the cover on the ink-well, substantially as described.

2. The combination, with an inkstand, of a cover for the ink-well, a bail pivoted in the stand, the bail crossing the ink-well, and being connected with the cover and having movement over the well, lever-arms having vertical and lateral movement, the said lever-arms being connected to each other at their outer ends and passed downward through the inkstand to a connection with the aforesaid bail, supporting-arms pivoted in the stand on which the lever-arms are fulcrumed, and springs located at the fulcrum of the lever-arms, the springs having bearing thereon at the rear of their point of fulcrum and upon the advanced portion of the supporting-arms, substantially as shown and described.

3. An inkstand having a member pivoted thereon, a cover for the well of the stand, the cover being attached to said member and movable with the same on and off of the ink-well, a supporting-arm pivotally connected to the inkstand, and a lever fulcrumed on the supporting-arm and connected with the said pivoted member, one end of the lever projecting beyond the inkstand, substantially as described.

4. An inkstand having a member pivoted thereon, a cover for the ink-well of the inkstand, the cover being connected to the said member and movable with the same to open and close the ink-well, a supporting-arm pivoted on the inkstand, a lever fulcrumed to the supporting-arm and connected with the said pivoted member, one end of the lever being projected beyond the ink-well, and a spring bearing on the lever and on the supporting-arm, substantially as described.

5. An inkstand having a bail, the ends of which are pivoted to the inkstand, an intermediate portion of which normally passes across the ink-well of the inkstand, a cover carried by said intermediate portion and moving with the bail to open and close the ink-well, two levers each having one of its ends connected with the respective arms of the bail, two supporting-links pivoted to the inkstand and respectively forming the fulcra of the levers, a spring actuating the levers, and a cross-bar connecting the free ends of the levers, such cross-bar being located outward from the inkstand, substantially as described.

ALEXANDER J. BLUNTACH.

Witnesses:
JOHN H. RAHSKOPF,
W. C. WEBSTER.